United States Patent [19]

Morinaga et al.

[11] Patent Number: 4,742,132
[45] Date of Patent: May 3, 1988

[54] PROCESS FOR THE POLYMERIZATION OR COPOLYMERIZATION OF ETHYLENE

[75] Inventors: Hiroshi Morinaga, Yotsukaido; Shigeharu Yamamoto; Sakae Kamiyama, both of Ichihara; Takeshi Iwabuchi, Chiba, all of Japan

[73] Assignee: Nissan Chemical Industries, Ltd., Tokyo, Japan

[21] Appl. No.: 921,824

[22] Filed: Oct. 21, 1986

Related U.S. Application Data

[63] Continuation of Ser. No. 753,130, Jul. 9, 1985, abandoned.

[30] Foreign Application Priority Data

Sep. 13, 1984 [JP] Japan ................ 59-191943

[51] Int. Cl.$^4$ .................. C08F 4/02; C08F 10/02
[52] U.S. Cl. ................... 526/128; 502/119; 502/125; 526/127; 526/348.6; 526/352
[58] Field of Search ................ 526/127, 128

[56] References Cited

U.S. PATENT DOCUMENTS

| | | | |
|---|---|---|---|
| 3,907,759 | 9/1975 | Okada et al. | 526/128 |
| 3,991,260 | 11/1976 | Matsuura et al. | 526/155 |
| 4,115,319 | 9/1978 | Scata et al. | 526/125 |
| 4,144,390 | 3/1979 | Derroitte et al. | 526/125 |
| 4,202,953 | 5/1980 | Matsuura et al. | 526/155 |
| 4,209,601 | 6/1980 | Kuroda et al. | 526/125 |
| 4,218,339 | 8/1980 | Zucchini et al. | 526/128 |
| 4,223,118 | 9/1980 | Tsubaki et al. | 526/128 |
| 4,258,167 | 3/1981 | Tsubaki et al. | 526/128 |
| 4,374,753 | 7/1981 | Pullukat et al. | 252/429 |
| 4,440,869 | 4/1984 | Shannon et al. | 526/125 |
| 4,511,669 | 4/1985 | Gessell | 526/124 |

FOREIGN PATENT DOCUMENTS 45976  3/1981 European Pat. Off. ............ 526/128

Primary Examiner—Edward J. Smith
Attorney, Agent, or Firm—Oblon, Fisher, Spivak, McClelland & Maier

[57] ABSTRACT

A process for polymerizing or copolymerizing ethylene, characterized in that ethylene or a mixture of ethylene with other α-olefin is polymerized in the presence of a catalyst comprising:

[I] a solid catalyst component (B) obtained by reacting the following three components:
  (a) a reaction product (A) of an organomagnesium compound with a hydropolysiloxane or a silicon compound in which organic groups and hydroxyl groups are bonded to silicon atoms,
  (b) a silicon compound of the formula $R_l^1Si(OR^2)_mX_{4-(l+m)}$, wherein $R^1$ is a hydrogen atom or a hydrocarbon group having from 1 to 8 carbon atoms, $R^2$ is a hydrocarbon group having from 1 to 12 carbon atoms, X is a halogen atom, l is 0, 1 or 2, and m is a number of from 0 to 4, and
  (c) a titanium compound of the formula $Ti(OR^3)_nX_{4-n}$, wherein $R^3$ is a hydrocarbon group having from 1 to 12 carbon atoms, X is a halogen atom, and n is a number of 0 to 4, provided that m and n are not simultaneously 0, and when m is 0, n is 4, and

[II] an organoaluminum compound.

8 Claims, No Drawings

PROCESS FOR THE POLYMERIZATION OR COPOLYMERIZATION OF ETHYLENE

This application is a continuation, of application Ser. No. 753,130, filed July 9, 1985, now abandoned.

The present invention relates to a process for polymerizing ethylene or copolymerizing ethylene with other α-olefin by means of a catalyst comprising a special solid catalyst component containing a titanium compound, and an organometallic compound, whereby a polymer having a narrow molecular weight distribution, a uniform particle size and a high bulk density is obtainable.

A catalyst system comprising a solid catalyst component containing magnesuim, halogen and titanium elements, and an organoaluminum compound, has been known as a highly active catalyst for the polymerization of olefins. It has been reported that a polymer obtainable by the polymerization of ethylene or the copolymerization of ethylene with other α-olefin by means of this catalyst system, generally has a narrow molecular weight distribution. In the case of a polymer of injection molding grade or extrusion molding grade, the mechanical strength is closely related to the molecular weight distribution of the polymer, and the molecular weight distribution is desired to be as narrow as possible. And, in the case of slurry polymerization, if the polymerization of ethylene or the copolymerization of ethylene with other α-olefin is conducted by using this catalyst system, a low molecular weight product soluble in the polymerization solvent forms in a substantial amount, which is likely to cause a deposition on the polymerization reactor during the production. Further, such a low molecular weight product is likely to cause fuming or waxy deposit around die-lips during the molding of the polymer. This is distinct particularly when ethylene is copolymerized with other α-olefin, and becomes more distinct when the copolymer is made to have a lower density.

If such polymerization solvent-soluble components are present in a substantial amount, it becomes difficult to remove the polymerization heat during the production of a low density polyethylene or an intermediate density polyethylene. Further, another serious problem is that the monomer used, is not effectively taken into the copolymer, whereby the loss of the monomer increases, and the productivity decreases.

Such polymerization solvent-soluble components comprise polymers having very low molecular weights and polymers having very low densities. The production of the polymers having very low molecular weights is determined by the molecular weight distribution at the time of the polymerization or copolymerization, and the production of the polymers having very low densities is likewise determined by the density distribution. Accordingly, as a means to reduce the polymerization solvent-soluble components, it is conceivable to make the molecular weight distribution of the polymer as narrow as possible.

On the other hand, in view of an increasing need for saving the installation and production costs by simplifying the process, it is necessary to improve the catalyst components to increase the catalytic activity per the transition metal and per the solid catalyst component, and make it possible to conduct an efficient continuous operation for a long period of time when a continuous slurry polymerization is carried out by means of such a catalyst. For this purpose, it is necessary to minimize the formation of fine polymer particles and obtain a polymer having a uniform particle size and a high bulk density.

The present inventors have conducted various researches on polymerization catalysts, and they have previously developed a method for polymerizing ethylene at a high catalytic activity by using a catalyst comprising an organometallic compound and a solid catalyst component insoluble in an inert hydrocarbon solvent, obtained by reacting a halogen-containing titanium or vanadium compound with a reaction product of a specific organosilicon compound with an organomagnesium compound, and have filed patent applications (U.S. Pat. No. 3,907,759, and Japanese Unexamined Patent Publication No. 212210/1982). According to these methods, the catalyst is highly active, the polymer has a high bulk density, the powder properties are good, and it is possible to conduct a continuous operation on an industrial scale for long period of time at a high slurry concentration.

However, for the production of an injection molding grade polymer or an extrusion molding grade polymer, it has been desired to further improve the mechanical strength. Further, in the production of a low or intermediate density polyethylene, the molecular weight distribution is not adequately narrow, and a substantial amount of polymerization solvent-soluble components is present, whereby it is likely that the particle properties deteriorate due to the swelling of the polymer.

Accordingly, it is a first object of the present invention to provide a process for producing an ethylene polymer or a copolymer of ethylene with other α-olefin having a narrow molecular weight distribution, and consequently having excellent mechanical strength and a minimum content of polymerization solvent-soluble components, by using a catalyst having a high catalytic activity.

A second object of the present invention is to provide a process for producing an ethylene polymer or a copolymer of ethylene with other α-olefin having a uniform particle size and a relatively high bulk density in order to make it possible to conduct a continuous operation on an industrial scale for a long period of time.

The present invention provides a process for polymerizing or copolymerizing ethylene, characterized in that ethylene or a mixture of ethylene with other α-olefin is polymerized in the presence of a catalyst comprising:

[I] a solid catalyst component (B) obtained by reacting the following three components:

(a) a reaction product (A) of an organomagnesium compound with a hydropolysiloxane or a silicon compound in which organic groups and hydroxyl groups are bonded to silicon atoms, (b) a silicon compound of the formula $R^1_l Si(OR^2)_m X_{4-(l+m)}$, wherein $R^1$ is a hydrogen atom or a hydrocarbon group having from 1 to 8 carbon atoms, $R^2$ is a hydrocarbon group having from 1 to 12 carbon atoms, X is a halogen atom, l is 0, 1 or 2, and m is a number of from 0 to 4, and (c) a titanium compound of the formula $Ti(OR^3)_n X_{4-n}$, wherein $R^3$ is a hydrocarbon group having from 1 to 12 carbon atoms, X is a halogen atom, and n is a number of from 0 to 4, provided that m and n are not simultaneously 0, and

[II] an organoaluminum compound.

Now, the present invention will be described in detail with reference to the preferred embodiments.

Silicon Compound

As the hydropolysiloxane to be used for the preparation of the reaction product (A) in the present invention, there may be mentioned compounds having a structural unit of the following formula I and optional degrees of polymerization, or a mixture of such compounds:

$$R^4_a H_b SiO_{\frac{4-a-b}{2}} \quad (I)$$

wherein $R^4$ is a monovalent organic group selected from the group consisting of an alkyl group, an aryl group, an aralkyl group, an alkoxy group and an aroxy group, a is 0, 1 or 2, and b is 1, 2 or 3 provided a +b≦3. They include grease-like or wax-like hydropolysiloxanes having various polymerization degrees ranging from those being liquid with a low viscosity and low polymerization degree to those having a viscosity of 100,000 centistokes, as well as solid substances. The structure of the terminal groups of the hydropolysiloxane does not substantially affect the catalytic activity, and may accordingly be closed with an optional inert group such as a trialkyl silyl group. As specific examples, there may be mentioned tetramethyl disiloxane, diphenyldisiloxane, trimethyl cyclotrisiloxane, tetramethyl cyclotetrasiloxane, methylhydropolysiloxane, phenylhydropolysiloxane, ethoxyhydropolysiloxane, cyclooctylhydropolysiloxane, and chlorophenyl hydropolysiloxane.

Another group of silicon compounds to be used for the preparation of the reaction product (A) in the present invention, includes silicon compounds in which organic groups and hydroxyl groups are bonded to silicon atoms, such as a silane compound of the formula:

$$R^4_n Si(OH)_{4-n} \quad (II)$$

wherein $R^5$ is a monovalent hydrocarbon group having from 1 to 18 carbon atoms, and n is 1, 2 or 3, and when a plurality of $R^5$ exist in one molecule, they may be the same or different, or a polysiloxane compound corresponding to a condensation product of the silane compound of the formula II. As specific examples of $R^5$ in the formula II, there may be mentioned an alkyl group, a cycloalkyl group, an aralkyl group, an aryl group, and an alkaryl group, which may be of a straight chained type, a brancehed type, a saturated type, an unsaturated type or a cyclic type. As specific examples of the silane compounds of the formula II wherein n is 3, there may be mentioned trimethyl hydroxysilane, triethyl hydroxysilane, triphenyl hydroxysilane, methyldiphenylhydroxysilane, and benzyldiphenyl hydroxysilane. Likewise, as specific examples of the compounds wherein n is 2, there may be mentioned diethyl dihydroxysilane, dipropyl dihydroxysilane, diallyl dihydroxysilane, dicyclohexyl dihydroxysilane and diphenyl dihydroxysilane. Further, as specific examples of the compounds wherein n is 1, there may be mentioned butyl trihydroxysilane and phenyl trihydroxysilane.

As the polysiloxane compound corresponding to a condensation product of the compound of the formula II, there may be employed those having a straight chain structure, a branched chain structure or a three dimensional network structure having a siloxane bond of Si-O-Si. There is no particular restriction with respect to the degree of polymerization, and it may range from the one having a low degree of polymerization having a viscosity at 25° C. of a few centistokes to a grease-like or wax-like compound having a viscosity of 1,000,000 centistokes, as well as a completely solid substance. As shown by the formula II, as the polysiloxane compound, there may be employed any compound so long as it contains at least one hydroxyl group per molecule. However, it is not practical to employ those wherein the number of hydroxyl groups is too small. The content of the hydroxyl groups in the polysiloxane compound is preferably at least 0.1% by weight.

As specific examples of the polysiloxane compound to be used in the present invention, there may be mentioned α, ω-dihydroxydimethyl polysiloxane represented by $HO[Si(CH_3)_2O]_nH$, wherein n is an integer of at least 2, and α, ω-dihydroxymethyl phenylpolysiloxane represented by $HO[Si(CH_3)(C_6H_5)O]_nH$, wherein n is an integer of at least 2.

The silicon compounds of the formulas I and II may be used alone or as a mixture of at least two different kinds for the preparation of the reaction product (A) in the present invention. Likewise, they may not necessarily be pure so long as a high catalytic efficiency is thereby obtainable.

Organomagnesium Compound

The organomagnesium compound to be used for the preparation of the reaction product (A) in the present invention, is a compound of the formula:

$$(MgR^6_2)_p \cdot (R^6MgX)_q \quad (III)$$

wherein $R^6$ is a hydrocarbon group, X is a halogen atom, and each of p and q is a number of from 0 to 1, provided p+q=1, its ether complex compound, or a mixture thereof. For instance, it includes a so-called Grignard reagent represented by $R^6MgX$ where p is 0 and q is 1, dihydrocarbyl magnesium represented by $R^6_2 Mg$ where p is 1 and q is 0, and other various organomagnesium halides represented by $(MgR^6_2)_p \cdot (R^6MgX)_q$, and ether complex compounds thereof or mixtures thereof. These organic magnesium compounds may readily be prepared by conventional methods, for instance, in an ether-type solvent such as diethyl ether, dibutyl ether or tetrahydrofuran or in a hydrocarbon solvent such as heptane, octane, benzene or toluene in the presence of a proper amount of a complexing agent such as an ether or amine.

Preparation of the reaction product (A)

The reaction product (A) to be used in the present invention, may readily be prepared by reacting an organonagnesium compound of the formula III with a hydropolysiloxane of the formula I, or a silicon compound of the formula II or a condensation product thereof, by an optional method. For instance, the reaction of the hydropolysiloxane and the organomagnesium compound reagent may be conducted by gradually adding, under stirring, the hydropolysiloxane to the organomagnesium compound synthesized in a suitable solvent, and after the addition of the entire amount, heating the mixture for a predetermined period of time. This reaction proceeds at room temperature with vigorous generation of heat, but in order to complete the reaction, it is preferred to heat the reaction mixture at a temperature of from 50° to 100° C. for 1 to 5 hours. However, this heating operation is not essential. The charging ratio of the hydropolysiloxane to the organomagnesium compound is preferably at a molar ratio of $MgR^6$ Si of from 0.05 : 1 to 1 : 1. Likewise, the reaction of the silicon compound of the formula II with the organomagnesium compound may be conducted, for instance, by a method wherein an organomagnesium compound synthesized in a suitable solvent is dropwise added to the silicon compound under stirring in an inert gas atmosphere, and after the addition of the entire amount, the stirring is continued for a predetermined period of time to complete the reaction. In this case, the silicon compound may be used alone, but it is also preferred to use it in the form diluted with a solvent such as a hydrocarbon solvent. This reaction can usually be conducted at a temperature of from $-50°$ to $100°$ C. The time required for the reaction is usually from 30 minutes to 5 hours. The charging ratio is preferably selected so that the molar ratio of the hydroxyl group (OH) of the silicon compound to the magnesium hydrocarbon bond ($MgR^6$), i.e. the molar ratio of OH : MgR6, is within a range of from 1 : 0.05 to 1 : 1. An optional ratio may be selected within this range.

The reaction product (A) thus obtained, can be used as it is in the form of the reaction mixture, for the reaction with the silicon compound and the titanium compound for the preparation of a solid catalyst component (B). However, when an ether derived from the organomagnesium compound is contained in a substantial amount, it is common to remove a part or whole of the solvent from the reaction mixture containing the reaction product (A) and then dissolve or suspend the reaction product afresh in an inert hydrocarbon solvent before supplying it for the preparation of the reaction product (B).

Preparation of the solid catalyst component (B)

The silicon compound to be used for the preparation of the solid catalyst component (B) in the present invention, is the one represented by the formula:

$$R^1{}_lSi(OR^2)_mX_{4-(l+m)} \qquad (IV)$$

wherein $R^1$ is a hydrogen atom or a hydrocabon group having from 1 to 8 carbon atoms, $R^2$ is a hydrocarbon group having from 1 to 12 carbon atoms, X is a halogen atom, l is 0, 1 or 2, and m is a number of from 0 to 4. Specifically, the following three groups of compounds are preferred:

(i) $Si(OCH_3)_4$, $Si(OC_2H_5)_4$, $Si(OC_3H_7)_4$, $HSi(OCH_3)_3$, $HSi(OC_2H_5)_3$, $CH_3Si(OCH_3)_3$, $CH_3Si(OC_2H_5)_3$, $C_2H_5Si(OCH_3)_3$, $C_2H_5Si(OC_2H_5)_3$ $CH_2=CHSi(OC_2H_5)_3$, $(CH_3)_2Si(OC_2H_5)_2$ (ii) $SiCl_4$, $HSiCl_3$, $CH_3SiCl_3$, $C_2H_5SiCl_3$ (iii) $Si(OC_2H_5)Cl_3$, $Si(OC_2H_5)_2Cl_2$, $Si(OC_2H_5)_3Cl$ Compounds (i) and (ii) may be reacted or mixed in an optional ratio to obtain a compound or mixture (iii). For the preparation of the catalyst of the present invention, the above compounds (i), (ii) and (iii) may be employed alone or in combination as a mixture.

The titanium compound to be used for the preparation of the solid catalyst component (B) in the present invention is the one represented by the formula:

$$Ti(OR^3)_nX_{4-n} \qquad (V)$$

wherein $R^3$ is a hydrocarbon group having from 1 to 12 carbon atoms, X is a halogen atom, and n is a number of from 0 to 4. Specifically, it includes $Ti(OCH_3)_4$, $Ti(OC_2H_5)_4$, $Ti(OC_3H_7)_4$, $Ti(OC_4H_9)_4$, $Ti(OC_8H_{17})_4$, $Ti(OC_3H_7)_3Cl$, $Ti(OC_3H_7)_2Cl_2$, $Ti(OC_3H_7)_3Cl$, $Ti(OC_4H_9)Cl_3$, $Ti(OC_4H_9)_2Cl_2$, $Ti(OC_4H_9)_3Cl$, $TiCl_4$, and $TiBr_4$.

Various methods may be employed to conduct the reaction of the three components, i.e. the reaction product (A), the silicon compound and the titanium compound, for the preparation of the solid catalyst component (B). There may be mentioned, for instance, (1) a method wherein the reaction product (A) and the silicon compound (or the titanium compound) are reacted first, and then the titanium compound (or the silicon compound) is reacted thereto, (2) a method wherein the silicon compound and the titanium compound are simultaneously added to the reaction product (A) to conduct the reaction, or (3) a method wherein the reaction product (A) is added to a mixture of the silicon compound and the titanium compound, to conduct the reaction. Particularly preferred is the method wherein the reaction product (A) is reacted with the silicon compound, followed by the reaction with the titanium compound, or the method wherein the silicon compound and the titanium compound are preliminarily reacted and then simultaneously added to the reaction product (A) to conduct the reaction.

The above reaction is usually conducted in an inert hydrocarbon solvent. It is particularly preferred to conduct the reaction in the presence of an aromatic or halogenated aromatic solvent such as benzene, toluene, or chlorobenzene.

The reaction of the reaction product (A) with the silicon compound is usually conducted at a temperature of from $0°$ to $110°$ C. for from 30 minutes to 3 hours. The reaction of the titanium compound with the reaction product (A) or with the product of the reaction of the reaction product (A) with the silicon compound, is usually conducted at a temperature of from $-30°$ to $150°$ C. for from 30 minutes to 5 hours. In the case where the silicon compound and the titanium compound are simultaneously added to the reactoin product (A), or the reaction product (A) is added to a mixture of the silicon compound and the titanium compound, the reaction is adequately carried out at a temperature of from $-30°$ to $150°$ C. for from 30 minutes to 5 hours. The ratio of the respective components is such that the silicon compound is within a range of from 0.1 to 5 mol per gram atom of magnesium in the reaction product (A). If the amount of the silicon compound is smaller than the lower limit of this range, the molecular weight distribution can not be adequately narrowed. The titanium compound is preferably within a range of from 0.05 to 5 mol per gram atom of magnesium in the reaction product (A). If the amount is less than the lower limit of this range, the catalytic activity will be remarkably reduced. If the amounts of the silicon compound and the titanium compound exceed the upper limits of the respective ranges, there is no substantial adverse effects to the present invention, but the use of such excessive amounts is uneconomical.

Thus, the solid catalyst component (B) is formed. It is subjected to washing with an inert hydrocarbon solvent such as hexane, heptane or kerosine to remove soluble components from the reaction mixture and to recover the solid catalyst component (B).

Organoaluminum compound

Another component of the catalyst system of the present invention is an organoaluminum compound. As its specific examples, there may be mentioned trimethyl aluminum, triethyl aluminum, tributyl aluminum, diethyl aluminum chloride, dibutyl aluminum chloride, ethyl aluminum sesquichloride, diethyl aluminum hydride, dibutyl aluminum hydride, and diethyl aluminum ethoxide.

The catalyst for the polymerization of ethylene to be used in the present invention, can readily be prepared by contacting the above-mentioned solid catalyst component (B) with the above-mentioned organoaluminum compound in the presence or absence of an inert solvent, for instance, by charging the two materials into a catalyst preparation vessel or a polymerization reactor in the presence of a solvent and stirring the mixture. A preferred ratio of the two components for the formation of the ethylene polymerization catalyst is from 1 to 1000 g atoms of aluminum per gram atom of titanium in the catalyst.

Polymerization method

In the present invention, the conditions for the polymerization of ethylene or the copolymerization of ethylen with an α-olefin, are the same as the conditions in the case where a common Ziegler type catalyst is employed, and the polymerization or copolymerization can be conducted in either liquid phase (inclusive of a slurry method and a solution method wherein the polymerization is conducted at a temperature at which the polymer is in a molten state) or vapour phase. Further, the polymerization may be conducted in two steps or more under different reaction conditions. The polymerization in liquid phase can readily be conducted by dispersing the catalyst of the present invention in a suitable inert hydrocarbon solvent such as hexane, heptane or kerosine, and introducing ethylene thereto. The polymerization temperature is preferably from 30° to 200° C., more preferably from 60° to 100° C. The polymerization pressure is preferably from atmospheric pressure to 50 kg/cm$^2$. In such a case, the amount of the catalyst is preferably such that the organoaluminum compound is from 0.05 to 50 mmol, more preferably from 0.1 to 10 mmol, per liter of the solvent.

The molecular weight of the polymer obtainable by the method of the present invention, may optionally be controlled by adjusting e.g. the polymerization temperature and the amount of the catalyst. However, the most effective method for controlling the molecular weight is to add hydrogen to the polymerization system.

The polymerization catalyst to be used in the present invention, is useful for the polymerization of ethylene and for the copolymerization of ethylene with an α-olefin such as propylene, butene-1, hexene-1 or octene-1.

Now, the present invention will be described in further detail with reference to Examples and Comparative Examples. However, it should be understood that the present invention is by no means restricted by these specific Examples.

The measuring methods employed are as follows:

MI$_2$: Melt index (ASTM D-1238-65T, 190° C., load: 2.16 kg).

MI$_{20}$: Same as above (load: 21.6 kg).

FR (flow ratio): This is an index for the molecular weight distribution, and is the ratio of MI$_{20}$ to MI$_2$, i.e. MI$_{20}$/MI$_2$. The smaller this value, the narrower the molecular weight distribution.

Bulk density: Measured in accordance with JIS K-6721-1966.

Particle size distribution: 50 g of polyethylene was classified by means of 11 different kinds of sieves ranging from 16 to 250 mesh by shaking the sieves for 15 minutes by a Ro-Tap model shaking machine, and the particle size distribution was obtained. The breadth of the particle size distribution is represented by log σ. Here σ is a geometric standard deviation in the logarithmic probability distribution formula. The greater the value, the wider the particle size distribution. ("Dust Collecting Apparatus" New Edition (Nikkan Kogyo Shinbunsha) pages 15–80 (1963))

EXAMPLE 1

(a) Preparation of the reaction product (A)

Into a glass reactor with its interior preliminarily well dried and substituted with nitrogen, 300 ml of a tetrahydrofuran solution of n-butylmagnesium chloride (0.670 mol of n-butylmagnesium chloride) was charged, and 42.0 ml of methylhydropolysiloxane with its terminals closed by trimethylsilyl groups (viscosity at 25° C.: about 30 centistokes, 0.70 mol of Si) was gradually dropwise added under stirring. In order to compensate the heat generation, the reactor was cooled with a cooling medium. After the addition of the entire amount, the mixture was kept at 70° C. for further 1 hour, and then cooled to room temperature to obtain a dark brown transparent solution.

In order to remove excess tetrahydrofuran, this solution was diluted with 400 ml of toluene, and 480 ml of a mixture of tetrahydrofuran and toluene was distilled off from this solution under reduced pressure of from 160 to 170 mmHg. Then, 480 ml of toluene was further added, and 480 ml of a mixture of tetrahydrofuran and toluene was distilled off in the same manner as above. The obtained solution was diluted with toluene, whereby 452 ml of a toluene solution of the reaction product (A) was obtained. The Mg concentration was 1.48 mol/liter.

(b) Preparation of a solid catalyst component (B)

Into a glass reactor equipped with a stirrer, a dropping funnel, a condenser and a thermometer, and with its interior preliminarily dried and substituted with nitrogen, 50 ml of toluene and 95 ml of the reaction product obtained in (a) (containing 0.14 g atom as calculated as Mg) were charged, and the mixture was heated to 50° C.

On the other hand, a solution obtained by reacting 30 ml of toluene, 8.1 ml (0.07 mol) of silicon tetrachloride and 15.7 ml (0.07 mol) of tetraethoxy silane, was collected in the dropping funnel, and this solution was dropwise added to the above reactor over a period of 30 minutes. Then, the solution was kept at this temperature for 1 hour.

Then, a solution obtained by preliminarily reacting 40 ml of toluene, 7.7 ml (0.07 mol) of titanium tetrachloride and 24.1 ml (0.07 mol) of tetra-normalbutoxy titanate at 50° C., was collected in the dropping funnel, and dropwise added to the above reactor over a period of 30 minutes. Thus, Mg contained in the reaction product (A) was calculated to be 0.14 g atom, a total amount of silicon in the silicon tetrachloride and tetraethoxy silane was 0.14 g atom, and a total amount of titanium in the titanium tetrachloride and tetra-normalbutoxy titanate was 0.14 g atom. Namely, the mixing ratio is Mg : Si : Ti =0.14 : 0.14 : 0.14=1 : 1 : 1. The mixing ratio in Table 1 represents this numerical value.

Then, the reaction was carried out by maintaining this temperature for further 2 hours. To the slurry thus obtained, n-hexane was added, and the soluble components were filtered off. This operation was repeated 6 times, whereupon a solid catalyst component (B) was obtained. This solid catalyst component contained 15.7 mg of titanium per gram of the solid catalyst component. The supported amount in Table 1 indicates this numerical value.

(c) Polymerization of ethylene

Into a stainless steel autoclave having an internal capacity of 1.6 liters and equipped with a stirrer and a heating and cooling jacket, with its interior dried and substituted with nitrogen, 600 ml of n-hexane was charged and heated to 60° C., and then 0.25 mmol of triethylaluminum and 4 mg of the solid catalyst component (B) obtained in the above (b) were sequentially added. Then, hydrogen was introduced under 2.0 kg/cm$^2$ (absolute pressure). After raising the temperature to 85° C., the polymerization was conducted for 3 hours while continuously introducing ethylene to bring the total pressure to a level of 8 kg/cm$^2$ (gauge pressure). After cooling, the polymer was separated from the solvent and dried.

99.5 g of white powder polyethylene was obtained. This polyethylene had MI$_2$ of 0.60, and FR of 26.4. Further, this polyethylene had an average particle size of 320 μm and log σ of 0.08. The content of fine particles having a particle size of less than 100 μm was 0%, and the particle distribution was extremely narrow. The bulk density was 0.300. The catalytic activity was 1584 kg/gTi and 24.9 kg/gcat. These data are shown in Table 1.

EXAMPLE 2

(b) Preparation of a solid catalyst component (B)

Into the same reactor as used in Example 1, 80 ml of toluene and 95 ml of the reaction product (A) as used in Example 1 were charged, and heated to 50° C. On the other hand, a solution mixture obtained by reacting 8.1 ml of silicon tetrachloride, 15.7 ml of tetraethoxy silane, 7.7 ml of titanium tetrachloride and 24.1 ml of tetranormalbutoxy titanate in 40 ml of toluene, was collected in the dropping funnel, and this solution mixture was dropwise added over a period of 1 hour. This reaction system was reacted at 50° C. for 2 hours. The slurry thereby obtained was washed with n-hexane in the same manner as in Example 1 to obtain a solid catalyst component (B).

(c) Polymerization of ethylene

The polymerization of ethylene was conducted in the same manner as in Example 1 except that the solid catalyst component (B) was used in an amount of 8 mg, and the polymerization time was changed to 1 hour, whereby 136.6 g of white powder polyethylene was obtained. The properties of this polyethylene were as shown in Tables.

EXAMPLE 3

(b) Preparation of a solid catalyst component (B)

The solid catalyst component (B) was obtained in the same manner as in Example 1 (b) except that the silicon compound solution and the titanium compound solution in Example 1 (b) were, respectively, dropwise added at 0° C. over a period of 30 minutes, followed by the reaction at 50° C. for 2 hours.

(c) Polymerization of ethylene

The polymerization of ethylene was conducted in the same manner as in Example 1 (c) except that the polymerization time was changed to 1 hour, whereby 85.2 g of white powder polyethylene was obtained. The properties of the polyethylene were as shown in Tables.

EXAMPLE 4

(a) Prepapation of a reaction product (A)

Into a glass reactor with its interior preliminarily well dried and substituted with nitrogen, 54 ml of α, 107 -dihydroxydimethylpolysiloxane (SiOH content: 0.146 mol) and 100 ml of toluene were charged, and 50 ml of a tetrahydrofuran solution of n-butylmagnesium chloride (0.146 mol of n-butylmagnesium chloride) was gradually dropwise added under stirring. The reactor was cooled with a cooling medium to compensate the heat generation. After the addition of the entire amount, the reaction mixture was kept at 70° C. for further 1 hour, and a solution with slight white turbidity was obtained. A part of this solution was tested for the presence or absence of unreacted n-butylmagnesium chloride by a Gilman's method, and it was found that no unreacted n-butylmagnesium chloride was present.

Then, in order to remove excess tetrahydrofuran, 400 ml of toluene was added, and the mixture was heated to distilled off about one half of the liquid phase. The solution thereby obtained was diluted with toluene to obtain 580 ml of a toluene solution having a magnesium concentration of 0.25 mol/liter.

(b) Preparation of a solid catalyst component (B)

The solid catalyst component (B) was obtained in the same manner as in Example 2 (b) except that 560 ml of the toluene solution of the reaction product (A) obtained above, was used.

(c) Polymerization of ethylene

The polymerization of ethylene was conducted under the same polymerization conditions as in Example 2, whereby 105.2 g of white powder polyethylene was obtained. The properties of the polyethylene were as shown in Tables.

EXAMPLES 5 to 15

The reaction product (A) of Example 1 (a) was combined with various silicon compounds and titanium compounds in various ratios as identified in Table 1 to obtain solid catalyst components (B) in accordance with the method described in Example 3 (b). The subsequent polymerization of ethylene was conducted in the same manner as in Example 3 (c).

EXAMPLE 16

Polymerization of ethylene with butene-1 was conducted for 1 hour by using 8.3 mg of the solid catalyst component (B) prepared in Example 1 at a polymerization temperature of 70° C., by supplying H$_2$ under pressure of 1 kg/cm$^2$ and 30 g of butene-1, while continuously introducing ethylene to bring the total pressure to a level of 6 kg/cm$^2$ (gauge pressure), whereby 86.9 g of white powder copolymer of ethylene with butene-1 was obtained. This copolymer had MI$_2$ of 0.224, FR of 30.7 and a density of 0.9299. This copolymer contained 5.5 g of n-hexane-soluble components. The ratio of the soluble components to the white powder copolymer was 0.063, as shown in Table 3.

The particle size distribution was very sharp, and particles having a particle size of less than 100 μm were not substantially present. The catalytic activity was 590 kg/g-Ti.hr, and 10.6 kg/g-cat.hr.

EXAMPLE 17

The polymerization was conducted in the same manner as in Example 16, except that the amount of butene-1 was changed to 40 g, whereby 97.9 g of a white powder copolymer of ethylene with butene-1 was obtained. This copolymer had $MI_2$ of 0.308, FR of 25.7, and a density of 0.9219. The n-hexane-soluble components in the copolymerization were 7.0 g. The particle size distribution was very sharp, and particles having a particle size of less than 100 μm were not substantially present.

The catalytic activity was 702 kg/g-Ti.hr and 12.6 kg/g-cat.hr.

COMPARATIVE EXAMPLE 1

(b) Preparation of a solid catalyst component (B)

A grey solid catalyst component was obtained in the same manner as in Example 1 (b) except that the silicon compound of Example 1 was not added. The titanium content in 1 g of this solid catalyst component was 95 mg.

(c) Polymerization of ethylene

The polymerization was conducted under the same conditions as in Example 1 (c) except that the polymerization temperature was changed to 80°, whereby 55 g of white powder polyethylene was obtained.

COMPARATIVE EXAMPLE 2

(b) Preparation of a solid catalyst component (B)

A solid catalyst component (B) was obtained in the same manner as in Example 1 (b) except that 0.14 mol of silicon tetrachloride was used as the silicon compound in Example 1 (b) and 0.14 mol of titanium tetrachloride was used as the titanium compound.

(c) Polymerization of ethylene

Into the same autoclave as used in Example 1 (c), 600 ml of n-hexane was charged, and heated to 60° C. Then, 0.5 mmol of triethyl aluminum and 4 mg of the solid catalyst component (B) obtained in the above (b) were added sequentially. Then, hydrogen was introduced under 2.5 kg/cm² (absolute pressure) and the temperature was raised to 75° C. Then, the polymerization was conducted for 1 hour while continuously introducing ethylene to bring the total pressure to a level of 8 kg/cm² (gauge pressure). After cooling, the polymer was separated from the solvent, and dried, whereby 84.1 g of white powder polyethylene was obtained. The properties of the polyethylene are shown in the following Tables.

COMPARATIVE EXAMPLE 3

The copolymerization of ethylene with butene-1 was conducted in the same manner as in Example 16 except that 2.1 mg of the solid catalyst component as used in Comparative Example 1, was used, whereby 94.6 g of a white powder copolymer of ethylene with butene-1 was obtained. The properties of the copolymer were shown in the following Table. The polymerization solvent-soluble contents were 14.8 g.

The test results of Examples 1 to 17 and Comparative Examples 1 to 3 are shown in Tables 1 to 5.

TABLE 1

Preparation of catalysts

| Examples | Preparation of (A) | Preparation of (B) | Silicon compound | Titanium compound | Mixing ratio | Supported amount |
|---|---|---|---|---|---|---|
| 1 | Example 1 (a) | Example 1 (b) | $SiCl_4 + Si(OC_2H_5)_4$ | $TiCl_4 + Ti(OnC_4H_9)_4$ | 1:1:1 | 15.7 |
| 2 | " | Example 2 (b) | $SiCl_4 + Si(OC_2H_5)_4$ | " | 1:1:1 | 20.5 |
| 3 | " | Example 3 (b) | $SiCl_4 + Si(OC_2H_5)_4$ | " | 1:1:1 | 23.2 |
| 4 | Example 4 (a) | Example 2 (b) | $SiCl_4 + Si(OC_2H_5)_4$ | " | 1:1:1 | 14.2 |
| 5 | Example 1 (a) | Example 3 (b) | $Si(OC_2H_5)_2Cl_2$ | $TiCl_4$ | 1:1:1 | 29.6 |
| 6 | " | " | " | $Ti(OnC_4H_9)Cl_3$ | 1:1:1 | 27.9 |
| 7 | " | " | $Si(OC_2H_5)Cl_3$ | $Ti(OnC_4H_9)_2Cl_2$ | 1:1:1 | 29.8 |
| 8 | " | " | $Si(OC_2H_5)_2Cl_2$ | $Ti(OisoC_3H_7)_2Cl_2$ | 1:1:1 | 23.6 |
| 9 | " | " | $Si(OC_2H_5)_4$ | $TiCl_4$ | 1:1:1 | 66.7 |
| 10 | " | " | $Si(O-isoC_3H_7)_4$ | " | 1:1:1 | 25.8 |
| 11 | " | " | $CH_2=CHSi(OC_2H_5)_3$ | " | 1:1:1 | 23.6 |
| 12 | " | " | $SiCl_4$ | $Ti(OnC_4H_9)_4$ | 1:1:1 | 27.8 |
| 13 | " | " | $Si(OC_2H_5)_2Cl_2$ | $Ti(OnC_4H_9)_2Cl_2$ | 1:2:1 | 19.8 |
| 14 | " | " | $CH_2=CHSi(OC_2H_5)_3$ | $TiCl_4$ | 1:0.5:1 | 60.7 |
| 15 | " | " | $CH_3Si(OC_2H_5)_3$ | " | 1:1:1 | 52.6 |
| 16 | " | Example 1 (b) | $SiCl_4 + Si(OC_2H_5)_4$ | $TiCl_4 + Ti(OnC_4H_9)_4$ | 1:1:1 | 15.7 |
| 17 | " | " | " | " | 1:1:1 | 15.7 |
| Comparative Example 1 | Example 1 (a) | Example 1 (b) | — | $TiCl_4 + Ti(OnC_4H_9)_4$ | 1:0:1 | 95 |
| Comparative Example 2 | " | " | $SiCl_4$ | $TiCl_4$ | 1:1:1 | 58.5 |
| Comparative Example 3 | " | " | — | $TiCl_4 + Ti(OnC_4H_9)_4$ | 1:0:1 | 15.7 |

TABLE 2

Polymerization & Catalytic Activities

| Examples | Polymerization conditions | Olefin | Catalytic activities I | II |
|---|---|---|---|---|
| 1 | Example 1 (c) | $C_2H_4$ | 1584 | 24.9 |
| 2 | Example 2 (c) | " | 833 | 17.1 |
| 3 | Example 3 (c) | " | 918 | 21.3 |
| 4 | Example 2 (c) | " | 926 | 13.2 |
| 5 | Example 3 (c) | " | 1581 | 46.8 |
| 6 | " | " | 1437 | 40.1 |
| 7 | " | " | 1500 | 44.7 |
| 8 | " | " | 812 | 19.2 |
| 9 | " | " | 153 | 10.2 |
| 10 | " | " | 1556 | 40.2 |
| 11 | " | " | 1010 | 23.8 |

TABLE 2-continued

| | Polymerization & Catalytic Activities | | | |
|---|---|---|---|---|
| | | | Catalytic activities | |
| | Polymerization | | | |
| Examples | conditions | Olefin | I | II |
| 12 | " | " | 1446 | 40.2 |
| 13 | " | " | 939 | 18.6 |
| 14 | " | " | 351 | 31.8 |
| 15 | " | " | 637 | 33.5 |
| 16 | Example 16 | $C_2H_4$, $C_4H_8$-1 | 590 | 10.6 |
| 17 | Example 17 | " | 702 | 12.6 |
| Comparative Example 1 | Example 1 (c) | $C_2H_4$ | | |
| Comparative Example 2 | " | " | | |
| Comparative Example 3 | Example 16 | $C_2H_4$, $C_4H_8$-1 | | |

TABLE 3

| | Production of soluble components as by-products | | |
|---|---|---|---|
| Examples | Polymer: [P] | Hexane-soluble contents: [W] | Production rate: [W]/[P] |
| 16 | 86.9 | 5.5 | 0.063 |
| 17 | 97.9 | 7.0 | 0.071 |
| Comparative Example 3 | 94.6 | 14.8 | 0.156 |

TABLE 4

| | Molecular weight distribution of polymers | |
|---|---|---|
| | Molecular weight distribution | |
| Examples | $MI_2$ | FR |
| 1 | 0.60 | 26.4 |
| 2 | 0.93 | 23.7 |
| 3 | 0.73 | 25.5 |
| 4 | 1.46 | 26.1 |
| 5 | 2.03 | 25.4 |
| 6 | 1.28 | 24.1 |
| 7 | 1.68 | 25.3 |
| 8 | 0.71 | 25.2 |
| 9 | 0.41 | 25.1 |
| 10 | 1.74 | 26.1 |
| 11 | 0.60 | 24.7 |
| 12 | 1.62 | 25.4 |
| 13 | 0.41 | 22.6 |
| 14 | 1.65 | 25.5 |
| 15 | 0.70 | 25.9 |
| 16 | 0.224 | 30.7 |
| 17 | 0.308 | 25.7 |
| Comparative Example 1 | 0.74 | 41.1 |
| Comparative Example 2 | 0.99 | 42.3 |
| Comparative Example 3 | 0.94 | 32.0 |

TABLE 5

| | Properties of polymer particles | | | |
|---|---|---|---|---|
| | Particle size distribution | | | |
| Examples | Average particle size | Less than 100μ | log σ | Bulk density |
| 1 | 320 μm | 0% | 0.08 | 0.300 |
| 2 | 240 | 2.3 | 0.12 | 0.345 |
| 3 | 172 | 1.6 | 0.15 | 0.317 |
| 4 | 305 | 0 | 0.11 | — |

The effects of the catalyst of the present invention may be summarized as follows:

(1) Catalytic activity (see Tables 1 and 2)

Examples 1 to 15 are directed to the homopolymerization of ethylene, and Examples 16 and 17 are directed to the copolymerization with butene. The catalytic activities are well qualified as a highly active catalyst from both the data per titanium unit (I) and the data per catalyst unit (II).

(2) Formation of insoluble components as by-products (Table 3)

Examples 16 and 17 and Comparative Example 3 are all directed to the copolymerization. In Comparative Example 3, the polymerization solvent-soluble components were produced in an amount at least about twice the amount in Examples 16 and 17, and the copolymer slurry was like rice-gruel. The catalyst of the present invention is industrially advantageous also in this respect.

(3) Improvement in FR (Table 4)

As mentioned above, when the molecular weight distributions are compared on the basis of FR, the smaller the value of FR, the narrower the molecular weight distribution. In the case of the homopolymerization of ethylene, FR is from 24 to 26 in Examples 1 to 15, whereas FR is about 42 in Comparative Examples 1 and 2. Thus, the catalyst of the present invention is evidently superior also in respect of the molecular weight distribution. The same is true in the case of the copolymerization of ethylene with butene-1, as is evident from the comparison between Examples 16 to 17 and Comparative Example 3.

(4) Particle size distribution (Table 5)

From the particle size distributions in Examples 1 to 4, it is evident that the formation of fine particles is minimum, and the distribution width as shown by log σ is narrow. The distribution of this degree is suitable for easy handling on an industrial scale.

(5) Bulk density (Table 5)

The measured values in Examples 1 to 3 range from 0.300 to 0.345. The method of the present invention meets the industrial requirements also in this respect.

We claim:

1. A process for polymerizing or copolymerizing ethylene, which comprises polymerizing ethylene or a mixture of ethylene with one or more other α-olefins in the presence of a catalyst consisting essentially of:

(A) a solid catalyst component obtained by reacting the following three components:

(i) a reaction product of an organomagnesium compound with a hydropolysiloxane or a silicon component in which orgainc groups and hdyroxyl groups are bonded to silicon atoms, (ii) a silicon compound selected from the group consisting of $Si(OCH_3)_4$, $Si(OC_2H_5)_4$, $Si(OC_3H_7)_4$, $HSi(OCH_3)_3$, $HSi(OC_2H_5)_3$, $CH_3Si(OCH_3)_3$, $CH_3Si(OC_2H_5)_3$, $C_2H_5Si(OCH_3)_3$, $C_2H_5Si(OC_2H_5)_3$, $CH_2=CHSi(OC_2H_5)_3$ and $(CH_3)_2Si(OC_2H_5)_2$, and (iii) a titanium compound of the formula [Ti(OR$^3$)$_n$R$_{4-n}$]Ti(OR$^3$)$_n$X$_{4-n}$, wherein R$^3$ is a hydrocarbon group having from 1 to 12 carbon atoms, X is a halogen atom, and n is a number of from 0 to 2, and (B) an organoaluminum compound, and wherein the molar ratio of organomagnesium compound to said hydropolysiloxane is in the range of 0.05:1 to 1:1; and the molar ratio of said organomagnesium compound to said hydroxy groups of said organohydroxysilicon compound is in the range of 0.05:1 to 1:1; a ratio of 0.05-5 mole of titanium compound per gram atom of magnesium is used; and 1-1,000 gram atoms of aluminum per gram atom of titanium is used.

2. The process according to claim 1, wherein the hydropolysiloxane has a structural unit of the formula:

$$R_a^4 H_b SiO_{\frac{4-a-b}{2}} \quad (I)$$

wherein $R^4$ is a monovalent organic group selected from the group consisting of an alkyl group, an aryl group, an aralkyl group, an alkoxy group and an aroxy group, a is 0, 1 or 2, and b is 1, 2 or 3 provided $a+b \leq 3$.

3. The process according to claim 1 in the silicon compound in which organic groups and hydroxyl groups are bonded to silicon atoms, is a silane compound of the formula:

$$R_n^5 Si(OH)_{4-n} \quad (II)$$

wherein $R^5$ is a monovalent hydrocarbon group having from 1 to 18 carbon atoms, and n is 1, 2 or 3, and when a plurality of $R^5$ exist in one molecule, they may be the same or different, or a polysiloxane compound corresponding to a condensation product of the silane compound of the formula II.

4. The process according to claim 1, wherein the organomagnesium compound is a compound of the formula:

$$(MgR_2^6)_p \cdot (R^6 MgX)_q \quad (III)$$

wherein $R^6$ is a hydrocarbon group, X is a halogen atom, and each of p and q is a number of from 0 to 1, provided $p+q=1$, its ether complex compound, or a mixture thereof.

5. The process according to claim 1, wherein the organoaluminum compound is selected from the group consisting of trimethyl aluminum, triethyl aluminum, tributyl aluminum, diethyl aluminum chloride, dibutyl aluminum chloride, ethyl aluminum sesquichloride, diethyl aluminum hydride, dibutyl aluminum hydride and diethyl aluminum ethoxide.

6. The process according to claim 1 wherein said α-olefin to be copolymerized with ethylene is one or more selected from the group consisting of propylene, butene-1, hexene-1, and octene-1.

7. The process according to claim 1, wherein said resulting polymer or copolymer has a narrow molecular weight distribution such that the flow rate (FR) is between about 24–26.

8. The process according to claim 1, wherein the titanium compound as component (iii) is selected from the group consisting of $Ti(OC_3H_7)Cl_3$, $Ti(OC_3H_7)_2Cl_2$, $Ti(OC_4H_9)Cl_3$, $Ti(OC_4H_9)_2Cl_2$, $TiCl_4$ and $TiBr_4$.

* * * * *